United States Patent [19]
Nadherny

[11] Patent Number: 5,472,158
[45] Date of Patent: Dec. 5, 1995

[54] DUAL PIPE ANCHOR

[75] Inventor: Rudolph E. Nadherny, Naperville, Ill.

[73] Assignee: Ireco, Inc., Chicago, Ill.

[21] Appl. No.: 259,905

[22] Filed: Jun. 15, 1994

[51] Int. Cl.$^6$ ............................................. F16L 5/00
[52] U.S. Cl. ........................... 248/56; 248/65; 403/384
[58] Field of Search ................... 248/73, 74.4, 49, 248/56, 57, 58, 65, 67.5; 285/421; 403/294, 384, 297

[56] References Cited

U.S. PATENT DOCUMENTS

| | | | |
|---|---|---|---|
| 2,546,792 | 3/1951 | Smith et al. | 248/58 |
| 2,625,354 | 1/1953 | Smith | 248/58 |
| 4,102,524 | 7/1978 | Cseri | 248/56 |
| 4,222,538 | 9/1980 | Jensen et al. | 258/56 |
| 5,330,140 | 7/1994 | Cseri | 248/74.2 |
| 5,370,344 | 12/1994 | Nadherny | 248/56 |

Primary Examiner—Ramon O. Ramirez
Attorney, Agent, or Firm—Lockwood, Alex, FitzGibbon & Cummings

[57] ABSTRACT

Pipe anchors for anchoring running lengths of pipe of different diameters to structural supports, particularly, for anchoring pipes in railroad cars to cross bearers or other structural supports in the cars. Each pipe anchor comprises an anchor base and a mating pipe-clamping wedge which when driven into place acts to clamp a length of pipe to the anchor base. The anchor base in the combination has dual, longitudinally aligned pipe-receiving cradle section with each section configured to embrace, fit and mate with either a smaller pipe (e.g., half-inch pipe) or a larger pipe (e.g., three-quarter inch pipe). Thus, each pipe anchor is capable of anchoring pipes of at least two different sizes or diameters to a structural support.

3 Claims, 3 Drawing Sheets

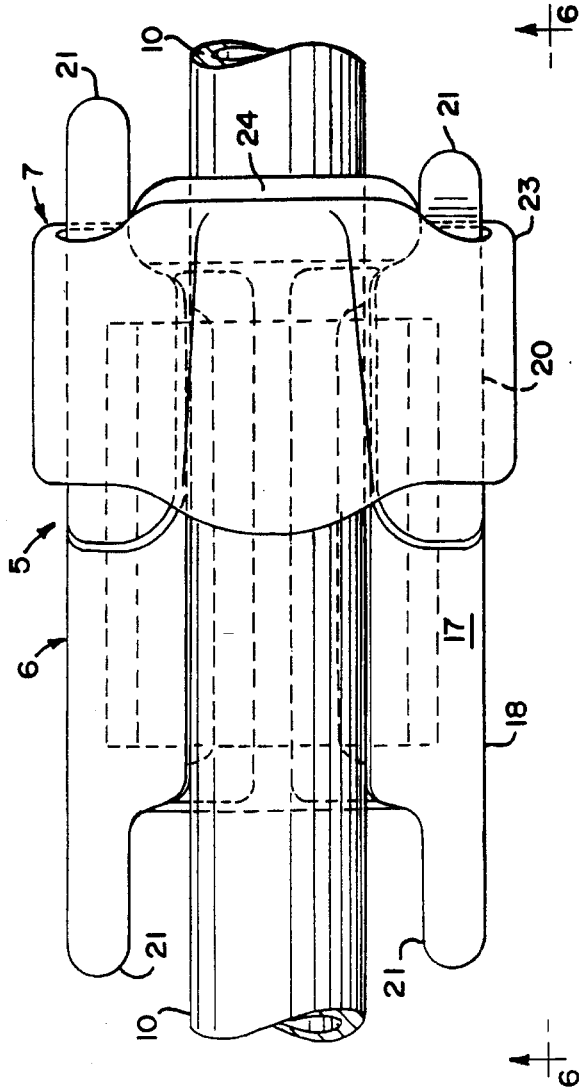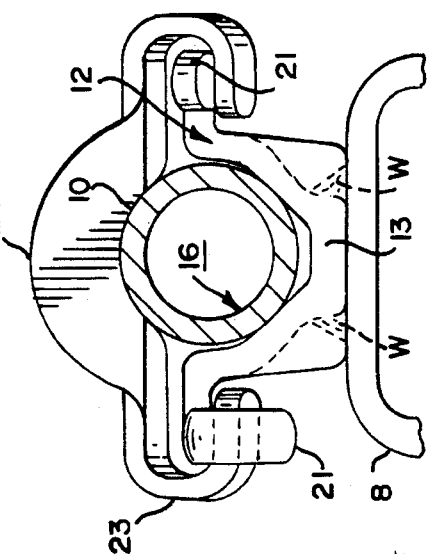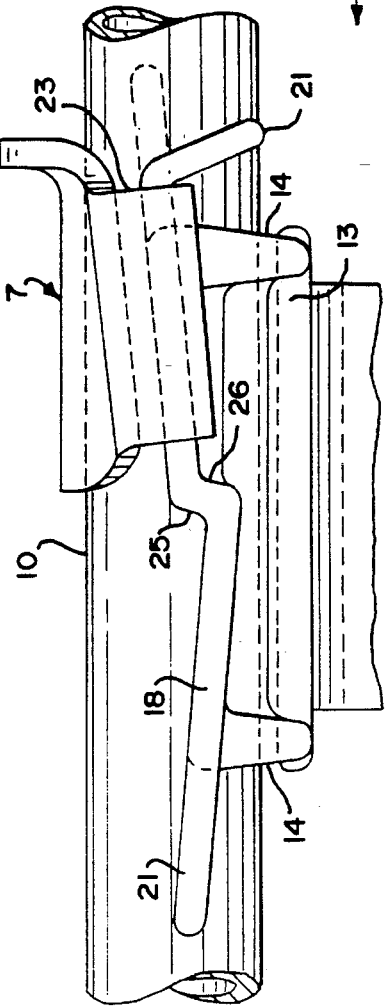

5,472,158

DUAL PIPE ANCHOR

BACKGROUND AND DESCRIPTION OF THE INVENTION

This invention relates, generally, to innovations and improvements in pipe anchors of the known general type for anchoring running lengths of pipe to structural supports. In particular, the invention relates to new and improved pipe anchors for anchoring pipes of different diameters in railroad cars to structural supports such as cross bearers in the cars. Pipe anchors of the general type to which the present invention relates are disclosed in U.S. Pat. No. 2,546,792 dated Mar. 27, 1951 and U.S. Pat. No. 4,222,538 dated Sep. 16, 1980.

Heretofore, pipe anchors have been provided wherein each pipe anchor is configured so as to be used with a pipe of a particular size or diameter. Hence, for anchoring pipes of different diameters, heretofore, it has been necessary to use pipe anchors which correspond to the various diameters of pipe to be anchored. For example, one size of pipe anchor may be used to anchor a half-inch pipe while a different size pipe anchor will be used to anchor a three-quarter inch pipe.

In various different installations or situations such as in railroad cars, pipes of two fairly close diameters may be used which require anchoring. Heretofore, the installers have had to have available and use supplies of pipe anchors for each of the two sizes of pipe. Since the anchor bases of the pipe anchors are substantially identical in appearance for different sizes of pipe, considerable care has to be taken to use the proper pipe anchors. Otherwise, a workman may install an anchor base of the wrong size to a structural member and later have to remove it and replace it with an anchor base of the correct size.

In accordance with the present invention, pipe anchors are provided which are capable of use with pipes of two different sizes. Accordingly, the pipe anchors provided by the present invention substantially reduce the inventory of pipe anchors required, avoid the need to maintain separate lots or supplies of different sizes; avoid the need to make the proper selection between the two different sizes, and eliminate the need to remove and replace anchor bases of the wrong size that may have been installed in error.

The object of the invention, generally stated, is the provision of dual pipe anchors of the type referred to above which may be used in anchoring pipes of two different sizes in various installations such as in anchoring air pipes and other train pipes in railway cars.

Certain other objects of the invention will be apparent to those skilled in the art and from the following detailed description of a presently preferred embodiment of the invention taken in connection with the accompanying drawings wherein:

BRIEF DESCRIPTION OF THE DRAWINGS

FIG. 5 is a plan view corresponding to FIG. 2 but showing pipe of a different size being clamped;

FIG. 6 is a side elevational view of the dual pipe anchor shown in FIG. 5; and

FIG. 7 is an end elevational view taken on line 7—7 of FIG. 6.

Referring to the drawings, a dual anchor embodying the present invention is indicated therein generally at 5 comprising an anchor base indicated generally at 6 and a pipe-clamping wedge indicated generally at 7 (two identical wedges being shown in FIG. 1). In FIG. 1, the anchor base 6 is shown mounted on a structural member indicated generally at 8 which typically could be a cross bearer or other structural member in a railroad car underframe. In FIG. 1, one wedge 7 is shown in association with a pipe 10 shown in broken line while another wedge 7 is shown at the opposite end of the anchor base 6 in association with a pipe 11 of smaller size shown in broken line. Normally, only a pipe of one size will be anchored in the pipe anchor 5 and only one pipe-clamping wedge 7 will be utilized. Only in the situation where the ends of two pipes of different sizes abut in the pipe anchor 5 will two wedges 7 be utilized. Thus, in FIGS. 2–4, the pipe anchor 5 is shown with the wedge 7 driven into place on the anchor base 6 so as to clamp in place a running length of pipe 11 of the smaller size. In FIGS. 5–7, a wedge 7 is shown in its driven condition clamping a running length of pipe 10 of the larger size to the anchor base 6 of the pipe anchor 5.

While the anchor base 6 has a special configuration in accordance with this invention, the pipe-clamping wedges 7 may be of known configuration and previously used commercially in combination with a pipe anchor base which is capable of accommodating and anchoring a pipe of only one size to a support structure.

Figure 4:
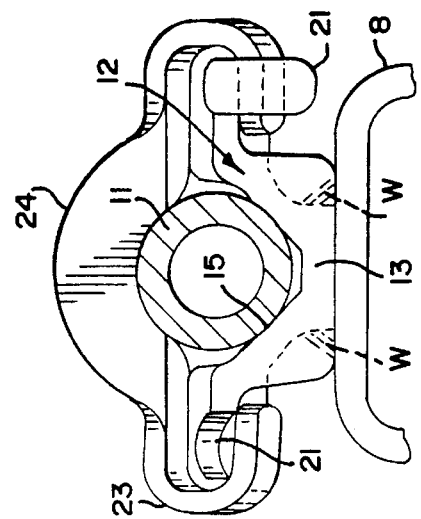
FIG. 4 is an end elevational view taken on line 4—4 of FIG. 3.

While in FIGS. 4 and 7 the anchor base 6 is shown secured to the structural member 8 by welds W, it will be understood that other means of attachment such as fasteners of known type such as bolts and nuts may be utilized in lieu of the welds.

The anchor base 6 is integrally formed with a longitudinally extending cradle portion indicated generally at 12, and a base or mounting portion 13 which is flat on the bottom having at opposite ends a pair of transversely extending legs 14—14. The base 13 and legs 14 are formed and dimensioned so as to have coplanar engagement with the top surface of the structural member 8 as shown in FIGS. 4 and 7.

Figure 1:
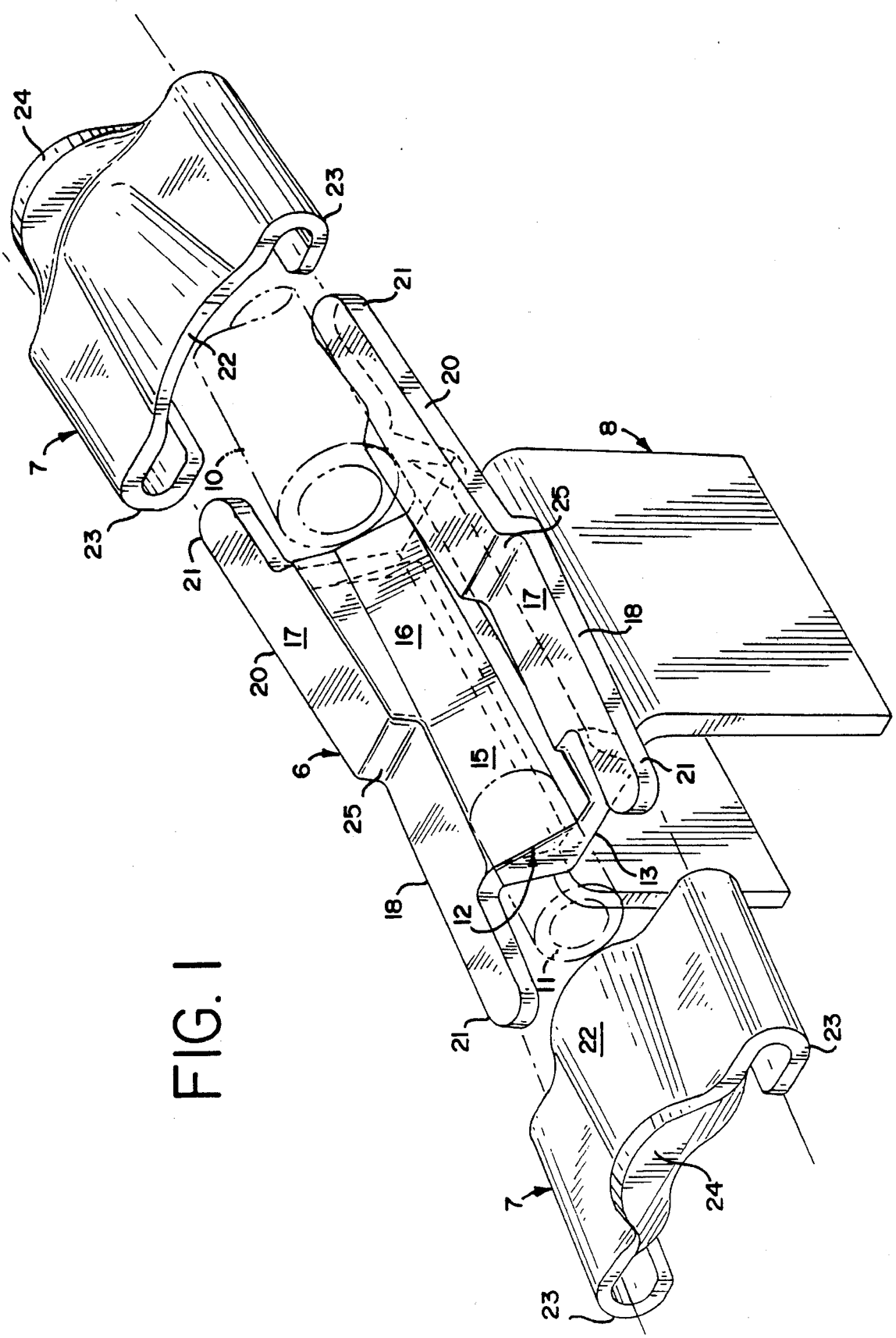
FIG. 1 is an exploded perspective view of a dual pipe anchor embodying the invention.
Figure 2:
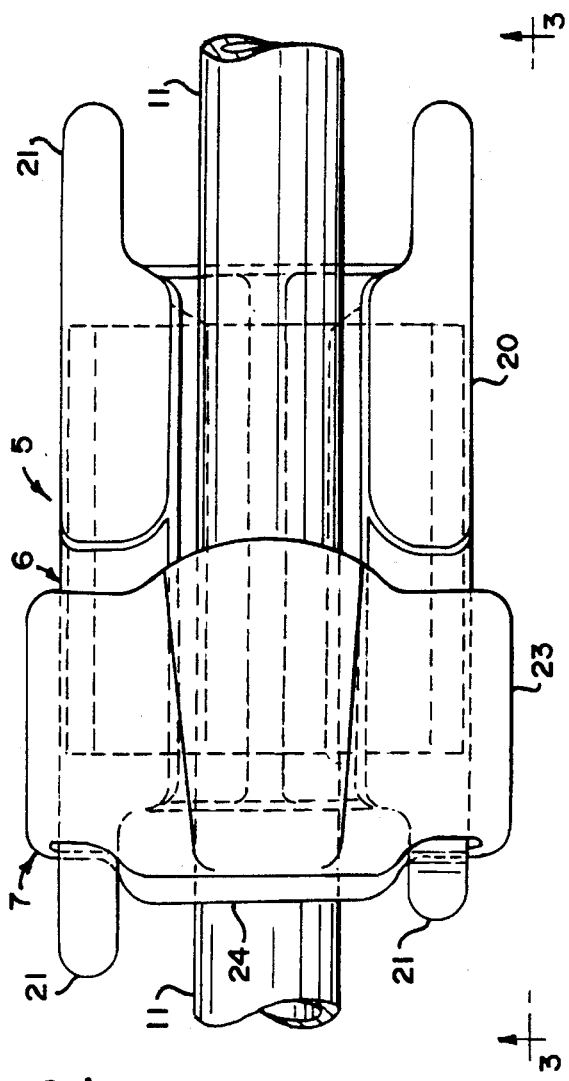
FIG. 2 is a plan view of a dual pipe anchor as shown in FIG. 1 in its assembled and installed condition clamping one size of pipe.
Figure 3:
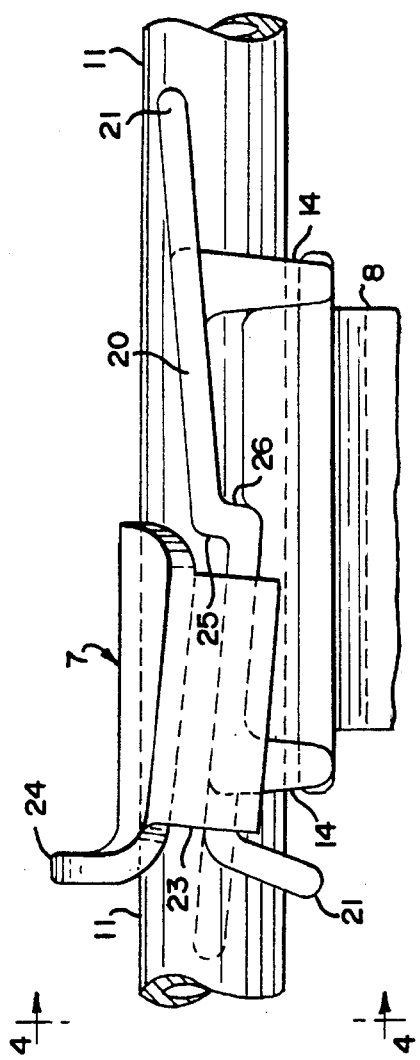
FIG. 3 is a side elevational view of the dual pipe anchor shown in FIG. 2.

The cradle portion 12 is formed in two longitudinally aligned sections or halves indicated generally at 15 and 16 in FIG. 1. The sections 15 and 16 is formed so as to embrace, fit and mate with either the pipe 11 of smaller diameter or with pipe 10 of larger diameter. The manner in which the smaller pipe 11 seats in the cradle section 15 is shown in FIG. 4 while the manner in which the pipe 10 of larger diameter seats in the cradle section 16 is shown in FIG. 7. On comparing FIGS. 4 and 7, it will be seen that the cradle section 15 is shallower than the cradle section 16. However, either a length of the smaller pipe 11 or a length of the larger pipe 10 will engage the entire length of the cradle 12 and will seat in both cradle sections 15 or 16 since their sidewalls are on the same angle (e.g., 45°).

Along opposite sides of the cradle 12, a pair of integrally formed wedge receiving flanges indicated generally at 17—17 extend. Each flange 17 has a section 18 which extends along the cradle portion 15 and another section 20 which extends along the cradle section 16. Both flange sections 18—18 and 20—20 have bendable locking tabs 21 at opposite ends which project at opposite ends of the cradle portion 12.

As indicated above, the clamping wedges 7 may be of known configuration and comprise an arcuate intermediate portion 22 with channel-shaped ear formations 23—23 extending along opposite sides and configured and dimensioned so as to interengage with the inclined flange sections 18—18 and 20—20 as shown in FIGS. 2–7.

In use, a plurality of anchor bases 6 will be welded or otherwise secured in alignment on a structural member 8. Then, a running length of pipe will be laid in the cradle portions 12 of the installed bases 6. The pipe will have either a smaller diameter or a larger diameter but both sizes will fit and seat in each of the cradle sections 15 or 16. If the pipe is of the smaller size, a wedge 7 will be driven in place from the cradle section 15 end so that the channel formations 23 will fit over and wedge on the opposing flange sections 18—18. The installer drives the wedge 7 into its full clamping condition in known manner by applying a series of blows to the upturned driving flange 24 on the wedge. The wedge cannot be driven past the shoulders 25—25 which serve as stops. If a length of pipe 10 of larger size is to be anchored, after it is in place, a wedge 7 is likewise applied from the cradle section 16 end of the cradle 12 to the opposing flanges 20—20. The shoulders 26—26 serve as stops to limit the wedge from being driven too far. After wedge 7 has been driven from either end into its full clamping condition, one of the adjacent locking tabs 21 will be bent downwardly as shown in FIGS. 2–7 so as to secure the assembly in place and resist any tendency of a wedge to loosen due to vibrations or inadvertently applied blows.

When a smaller pipe (e.g., half-inch) is seated in the cradle 12 of the base 6, a wedge has to be applied from the cradle section 15 end. While a wedge 7 can be applied from the cradle section 16 end it will be too loose to clamp the smaller pipe since it will be seated too deep in section 15 with respect to the flanges 20—20. On the other hand, if a larger pipe (e.g., three-quarter inch) is seated in the cradle 12 a wedge 7 will not fit at the cradle section 15 end since the longer pipe will not be seated deep enough in section 15 with respect to flanges 18—18.

What is claimed is:

1. A dual pipe anchor for embracing and anchoring pipes of different diameters to structural supports, comprising an anchor base and a mating pipe-clamping wedge, said base having a longitudinally extending pipe-engaging cradle portion and a mounting portion for securement to a structural member, said cradle portion having two longitudinally aligned pipe-receiving sections one of which is shaped to fit and mate with a smaller diameter pipe and the other of which is shaped to fit and mate with a larger diameter pipe with one of said pipe-receiving sections being shallower and the other pipe-receiving section being deeper with respect to each other, and said base having laterally projecting, wedge-engaging means extending longitudinally along its opposite sides and said pipe-clamping wedge having a longitudinally extending pipe-engaging portion which is arcuate in transverse cross section and laterally projecting base-engaging means extending longitudinally along opposite sides having interlocking mating engagement with said laterally projecting wedge-engaging means on said base for clamping a pipe seated in said cradle portion to said base when said wedge is driven from one end of said base into said interlocking mating engagement.

2. The dual pipe anchor of claim 1 wherein said laterally projecting, wedge-engaging means on said base are in the form of two-section flanges with the flanges of one section extending longitudinally along one of said pipe-receiving sections of said cradle portion and the flanges of the other section extending longitudinally along the other pipe-receiving section of said cradle portion, and said laterally projecting base-engaging means on said wedge being in the form of channels which receive said flange sections therein.

3. The dual pipe anchor of claim 2 wherein when a pipe of said smaller diameter is seated in said cradle portion said pipe-clamping wedge can be driven into pipe-clamping engagement only from the end of said base having said shallower cradle section and when a pipe of said larger diameter is seated in said cradle said portion pipe-clamping wedge can be driven into pipe-clamping engagement only from the end of said base having said deeper cradle section.

\* \* \* \* \*